United States Patent
Berry et al.

(10) Patent No.: US 6,612,830 B2
(45) Date of Patent: Sep. 2, 2003

(54) ANODE GAS BURNER FOR INERT GAS GENERATION, METHOD AND APPARATUS

(75) Inventors: Jonathan D. Berry, Meriden, CT (US); Theodore R Strickland, Madison, CT (US)

(73) Assignee: Precision Combustion, Inc., North Haven, CT (US)

( * ) Notice: Subject to any disclaimer, the term of this patent is extended or adjusted under 35 U.S.C. 154(b) by 6 days.

(21) Appl. No.: 09/928,281

(22) Filed: Aug. 10, 2001

(65) Prior Publication Data

US 2003/0031966 A1 Feb. 13, 2003

(51) Int. Cl.[7] ................................................. F23D 3/40
(52) U.S. Cl. ............................ 431/7; 431/326; 423/651
(58) Field of Search ............................... 431/6, 7, 9, 11, 431/115, 208, 268, 326; 422/198, 211; 423/648.1, 650, 651; 429/19, 20

(56) References Cited

U.S. PATENT DOCUMENTS 5,248,567 A * 9/1993 Amemiya et al. ............. 429/20
5,938,427 A * 8/1999 Suzuki et al. ................ 431/208
6,224,370 B1 * 5/2001 Tomizawa et al. ........... 431/326
6,302,683 B1 * 10/2001 Vestin et al. .................... 431/7
2001/0009731 A1 * 7/2001 Ruoff et al. ................... 429/19
2002/0064739 A1 * 5/2002 Boneberg et al. ............... 431/7

* cited by examiner

Primary Examiner—Henry Bennett
Assistant Examiner—James G. Barrow
(74) Attorney, Agent, or Firm—McCormick, Paulding & Huber LLP

(57) ABSTRACT

The invention is a method and apparatus for purging an oxidant or residual fuel by controlled oxidation within a closed loop system. The particular application disclosed can operate to purge oxygen from an anode loop of a fuel cell just prior to startup, and can also operate to consume the remaining hydrogen or fuel at shutdown. The method employs the addition of additional fuel to a feed stream within the anode loop to a level that will through oxidation within the apparatus deplete the desired amount of oxygen. The method also employs the addition of air into a hydrogen feed loop that through oxidation within the apparatus consumes the hydrogen. Oxidation is accomplished first by diffusion burning and then catalysis to accomplish the depletion quickly. The method and apparatus eliminates the need for a separately stored inert gas purge tank and associated systems.

20 Claims, 2 Drawing Sheets

ANODE GAS BURNER FOR INERT GAS GENERATION, METHOD AND APPARATUS

FIELD OF THE INVENTION

The present invention is generally directed to a burner and more specifically, a two-stage burner with a diffusion flame upstream of a catalytic reactor.

BACKGROUND OF THE INVENTION

Fuel cells are electrochemical devices that convert a fuel's energy directly to electrical energy. A Proton Exchange Membrane (PEM) fuel cell produces electricity by first separating hydrogen into hydrogen ions and electrons with the aid of a catalyst within an anode loop. The hydrogen ions then pass through an electrolyte membrane from the anode loop to a cathode side of the fuel cell. The electrons, which can not penetrate the membrane, flow through an external circuit in the form of electric current. On the cathode side of the fuel cell, oxygen from the air combines with the hydrogen ions to form water. When the fuel cell power plant is at rest, the anode loop seeks equilibrium with the cathode side; thus oxygen (a constituent of air present of the cathode side) passes through the membrane and builds up in the anode loop.

During startup of the fuel cell, the anode loop, which is a closed loop, has relatively pure hydrogen gas injected into it from a storage source. As the anode loop employs a catalyst in the form of a platinum coating, to help separate the hydrogen gas into ions and electrons, high concentrations of hydrogen in conjunction with oxygen in the presence of a catalyst could be an explosive combination. Therefore, oxygen levels within the anode loop must be controlled to permit the introduction of hydrogen. Similarly at shutdown, hydrogen levels must be controlled to stop the flow of current and to again eliminate the potential explosion hazard of a hydrogen and oxygen mixture, or the release of hydrogen into the ambient air.

Controlling the levels of oxygen, or hydrogen, within the anode loop has been accomplished by purging the loop with an inert gas. Purging has been used prior to system startup as well as after system shutdown. Purging, however, requires a storage system for an inert gas, such as nitrogen. In a mobile fuel cell this type of purging is not a desirable option, as nitrogen would have to be transported with the ancillary requirement for recharging. In addition, purging for startup of a mobile fuel cell, such as the power source in a car, must be accomplished within acceptable timeframes to consumers, which generally do not wish to wait more than a couple of seconds to start their cars.

It is therefore the objective of the present invention to provide an alternative method and structure for controlling the levels of oxygen on startup and the levels of hydrogen at shutdown within the anode loop. It is a further objective of this invention to accomplish the degree of control required within a timeframe acceptable to consumers.

SUMMARY OF THE INVENTION

The invention is directed in one aspect to a structure and method that employs oxidation to deplete to an acceptable level an undesired constituent from a closed loop system. In the specific application of a PEM fuel cell, the invention can be employed to deplete oxygen at startup and hydrogen at shutdown from the anode loop.

The invention comprises a housing having an entrance and exit. Downstream of the housing entrance is an injector. Downstream of the injector is a flame stabilizer that creates a recirculation zone for anchoring a diffusion flame. Further downstream of the flame stabilizer is an igniter. The igniter is positioned such that it is within or proximate to the recirculation zone created by the flame stabilizer.

Downstream of the igniter is a catalytic module having an upstream surface. The catalytic module is placed sufficiently downstream of the igniter such that it is downstream of the diffusion flame. The catalytic module can be made using any well known technique for making a catalyst bed, including but not limited to catalyst deposited on or alloyed with such supports as screen, expanded metal, foam, gauze or ceramic monolith, or catalyst in the form of pellets. In the preferred embodiment, short channel screens with catalyst deposited thereon were used. The catalyst is selected based upon the reaction contemplated. Common catalysts for hydrogen and oxygen reactions are platinum and palladium.

In a refinement of the invention, a first heat exchanger is positioned between the igniter and the catalytic module. The heat exchanger can be passive or active. It is desired that the first heat exchanger be positioned sufficiently downstream of the igniter such that it is beyond the diffusion flame. A second heat exchanger, passive or active, can be positioned downstream of the catalytic module.

To assure timely catalytic module light off, sufficient catalytic activity, a heating element can be placed proximate to the upstream surface of the catalytic module. In the preferred embodiment an electrical resistive heating element was woven into the upstream surface of the catalytic module. A separate heating element is also acceptable. The heating element need not be electric and the present invention should not be considered so limited.

The method of operation of the present invention relies on a two-step oxidation process to deplete the undesired constituent, fuel or oxidant. The first oxidation step relies on diffusion burning of a stratified mixture. Within the stratified mixture at the boundaries between the fuel and oxidant, pockets of fuel and oxidant within flammability limits will exist. The igniter initially ignites these pockets, with additional pockets being ignited therefrom, and the pockets will continue to react by diffusion burning until the undesired constituent, fuel or oxidant, is consumed to such a point that the pocket is no longer within the flammability limit. The resulting reactive products and remaining fuel and oxidant mixture then pass into the downstream catalytic module where catalytic oxidation completes the reaction of the undesired constituent.

It is a matter of design choice as to the degree of depletion of the undesired constituent the present invention accomplishes. While diffusion burning within a pocket can only deplete the undesired constituent to the lower flammability limit, catalytic combustion can essentially deplete the undesired constituent to for all practical purposes zero. The level of ultimate depletion is design specific.

The use of the present invention for startup of a fuel cell is as follows. At startup the undesired constituent within the anode loop is oxygen and it must be depleted to a level such that hydrogen can be safely added to the anode side to start the PEM reactor. First, a feed stream in the anode loop comprising oxygen is enhanced with an additional fuel that can be oxidized in the presence of the oxygen. In the case of a mobile fuel cell, hydrogen is desired as the additional fuel as it is already onboard; however, other fuels could be used. The amount of additional fuel that is added to the feed stream is at least equal to the amount needed to react the desired amount of oxygen to reach the desired depleted oxygen condition. A target depletion level for the oxygen is one-half of one percent by volume. Additional fuel beyond that required for the desired depletion level could be added but not so much that the pockets will exceed the upper flammability limit, or the concentration is high enough after exiting the burner to initiate a reaction within the cell stack.

After the additional fuel is added to the feed stream if the stoichiometry, the ratio of fuel to oxygen, is within the flammability limits, fuel will be oxidized by diffusion burning. The flame will self extinguish when the oxygen has been consumed such that the stoichiometry is below the lower flammability limit.

The balance of the oxygen and fuel then enters the catalytic module and continues to be oxidized in the presence of the catalyst. Unlike diffusion burning which requires that the stoichiometry be within flammability limits, catalytic oxidation has no such limitation. Thus catalytic oxidation further reduces the amount of oxygen in the feed stream down to potentially almost zero. The method of the present invention, therefore, has the advantage over one-step diffusion burning in that oxygen levels can be reduced below the concentration level fixed by the lower flammability limit.

The method of the present invention also has advantages over one-step catalytic oxidation. To accomplish desired levels of depletion within a single pass through a catalytic module, the catalytic module would have to operate at near stoichiometric conditions producing high temperatures. Material limits of the catalytic module, substrate and/or catalyst, limit the ability to operate at this condition. To accomplish desired levels of depletion therefore, multiple passes through the catalytic module would be required. Multiple passes through the catalytic module means the feed gas would circulate around the anode loop multiple times thereby heating the membrane, unless a heat exchanger to moderate burner exit gas temperatures that would slowly rise with each pass was provided.

In one specific application, it has been estimated that a one-step catalytic system would require 10 passes of the fuel and oxidant mixture through the catalytic module (10 loops around the anode loop), requiring 20 seconds. The combined system of the present invention would accomplish the desired depletion within three loops, or about three seconds. Times will vary depending on system layouts and plumbing volumes.

The use of the present invention for shutdown of the fuel cell is as follows. For shutdown, the anode loop contains pure hydrogen, oxygen, generally as a constituent of air, is added at the feed stream to oxidize the hydrogen. The amount of oxygen added is at least equal to the amount needed to oxidize the desired amount of hydrogen to reach the desired depleted hydrogen condition, for example below a few hundred parts per million (ppm) by volume. Excess oxygen, however, is preferred to assure complete oxidation of the hydrogen. Again depleted does not necessarily mean all hydrogen has been removed, only that the hydrogen has been removed to the level desired, which is application dependent.

After the additional oxygen is added to the hydrogen feed stream, if the stoichiometry, the ratio of hydrogen to oxygen, is within the flammability limits, hydrogen fuel will be oxidized by diffusion flame burning. The flame will self extinguish when the hydrogen has been consumed such that the stoichiometry is below the lower flammability limit, around 4% hydrogen by volume. In order to remove additional hydrogen, the remaining hydrogen continues to be oxidized in the presence of the downstream catalyst.

DETAILED DESCRIPTION

Figure 1:
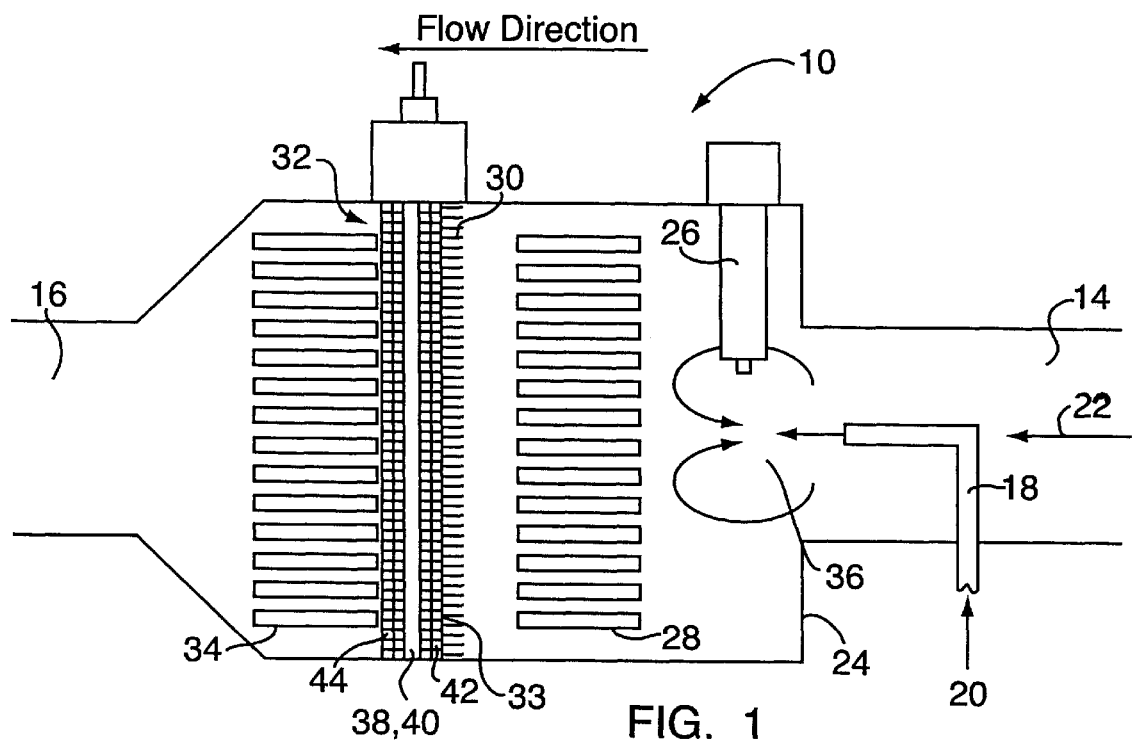
FIG. 1 is a schematic representation of the burner embodying the present invention.

FIG. 1 is a schematic of the present invention. The burner, generally designated by the reference number 10, is composed of housing 12 with an entrance 14 and an exit 16. The entrance 14 and exit 16 are connected into the anode loop of the fuel cell (not shown). The arrow labeled "Flow Direction" depicts the normal flow through the burner 10.

Positioned within the housing 12, within the entrance 14 is an injector 18 through which a fluid 20 is injected into a feed stream 22, which contains the undesired constituent. In the case of PEM Cell startup the fluid 20 could be hydrogen and the feed stream 22 could contain the undesirable constituent oxygen, and in the case of shutdown the fluid 22 could be oxygen and the feed stream 22 could contain the undesirable constituent hydrogen. The anode loop blower (not shown) accomplishes flow of the feed stream 22 through burner 10 in the flow direction. Downstream from the injector 18 is a flame stabilizer 24. Flame stabilizer 24 is depicted as a dump, but as those skilled in the art know, there are other structures that stabilize or anchor a diffusion flame and those structures are considered within the scope of the invention.

Located proximate to the flame stabilizer 24, within the recirculation zone created by the flame stabilizer 24, is an igniter 26. Downstream of igniter 26 is optional first heat exchanger 28 and further downstream optional resistive heater 30. Downstream of resistive heater 30 is a catalytic module 32 having an upstream surface 33. Finally, optional second heat exchanger 34 is located downstream of catalytic module 32.

Figure 3:
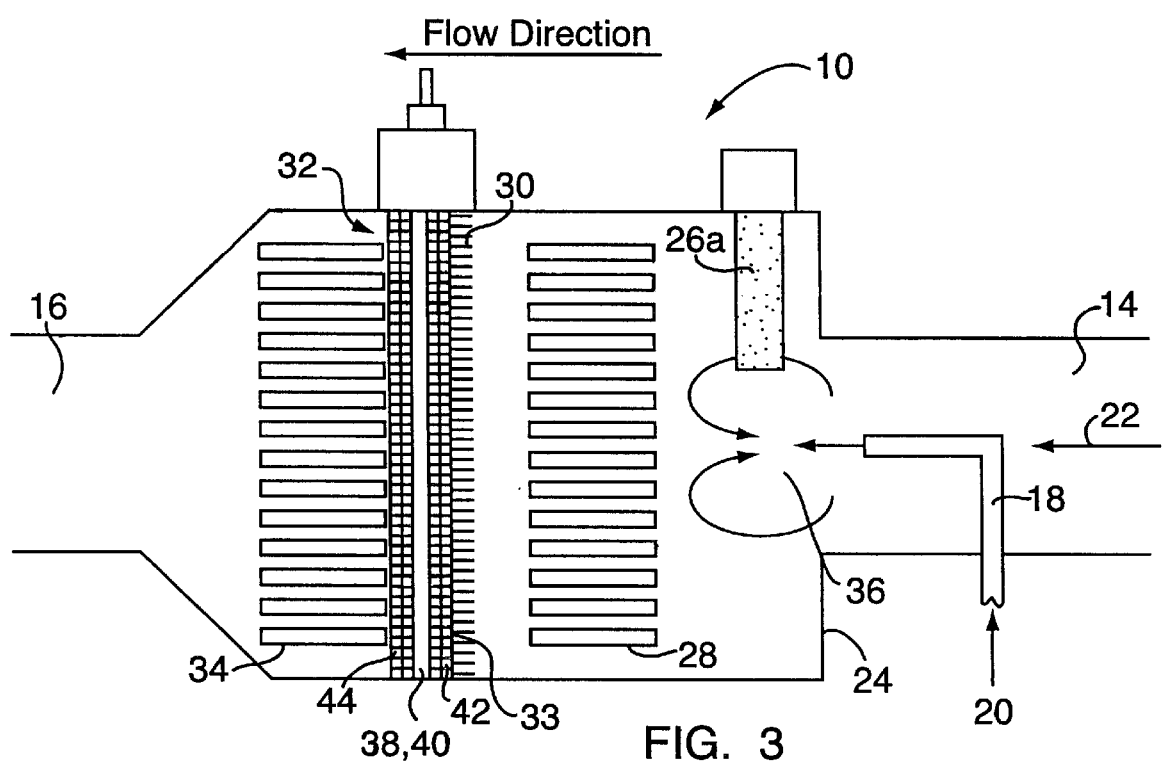
FIG. 3 is a schematic representation of the burner of FIG. 1 using a different igniter.

Spacing between the elements within the housing is design specific. However certain guidelines should be followed. The flame stabilizer 24 creates a flame stabilization region 36. The igniter 26 must be proximally located to the flame stabilizer 24 in contact with the flame stabilization region 36 such that the igniter 26 can ignite the resulting feed stream 22 and fluid 20 mixture. The flame stabilization region 36 should be sized such that the resulting diffusion flame does not impinge upon the downstream components The fluid 20 injected through injector 18 locally combines with feed stream 22 in a stratified manner such the mixture can be oxidized by diffusion flame in the flame stabilization region 36. The igniter 26 has the function of providing prompt ignition of the feed stream 22 fluid 20 mixture to minimize slippage, passage of the undesired constituent through the flame stabilization region 36 prior to ignition. While it is important to initiate burning as a diffusion flame as quickly as possible, this is especially true during startup. The depicted igniter is of the spark type, but other igniters such as catalytic 26A (depicted in FIG. 3) or hot surface are considered within the scope of the invention.

The design of the catalytic module 32 is application specific. The catalytic module 32 comprises a substrate 38 unto which a catalyst 40 is deposited. In a prototype anode loop burner, the catalytic module 32 had an upstream section 42 and a downstream section 44. The upstream section 42 used a woven ceramic mesh substrate having a very high surface area and low thermal mass, which supported a quicker light off of the catalyst 40. The downstream section 44 used a metal substrate.

Catalyst 40 is positioned at the surface of substrate 42 and 44 and is application dependent, depending upon the fluid 20, or any variation in composition of feed stream 22. In general, it is desirable to select the most cost-effective catalyst, with acceptable performance and durability characteristics. Those skilled in the art of catalyst selection and positioning will appreciate the many alternative catalyst and methods of positioning thereof, such as deposition or alloying.

The first and second heat exchangers 28 and 34 respectively, are passive heat exchangers, but this should not be considered a limitation of the invention. In a prototype anode burner, the heat exchangers were concentrically assembled threaded pipes. Thick wall pipe provides a large heat sink while the threads provide increased surface area to assist in rapid heat extraction. The rapid heat absorption characteristics of the pipe assured that even during startup, the catalytic module 32 was protected against excessive temperatures. In addition, heat exchangers 28 and 34 helped to assure that downstream fuel cell components were protected from the temperatures generated within the burner. Additional heat exchangers may be required and are application specific.

The optional heater 30 provides heating to the feed stream 22 containing fluid 20 providing a wider range of operation and quicker light off of the catalytic module 32, this feature is especially important to deal with slippage. The heater is positioned proximate to the upstream surface 33, either integrated into the catalyst module 32 or immediately upstream. It is preferred that the heater is a resistive electrical heater, but other heaters are considered within the scope of the invention. The heater 30 also acts as a redundant ignition system to the upstream diffusion flame region. The hot resistive heater surfaces in combination with the catalytic reactor surfaces cause local ignition of the mixture that tends to flashback to the upstream flame holding region, where it stabilizes. In a prototype anode loop inerting burner, the resistive heater 30 was constructed from nicrome ribbon and placed between the leading woven ceramic mesh substrates of the catalytic module 32. The woven ceramic mesh substrates acted as insulators. The resistive heater 30 could have been placed upstream of catalytic module 32. All that is required is the resistive heater be proximate to a front surface 33 of the catalytic module 32.

Figure 2:
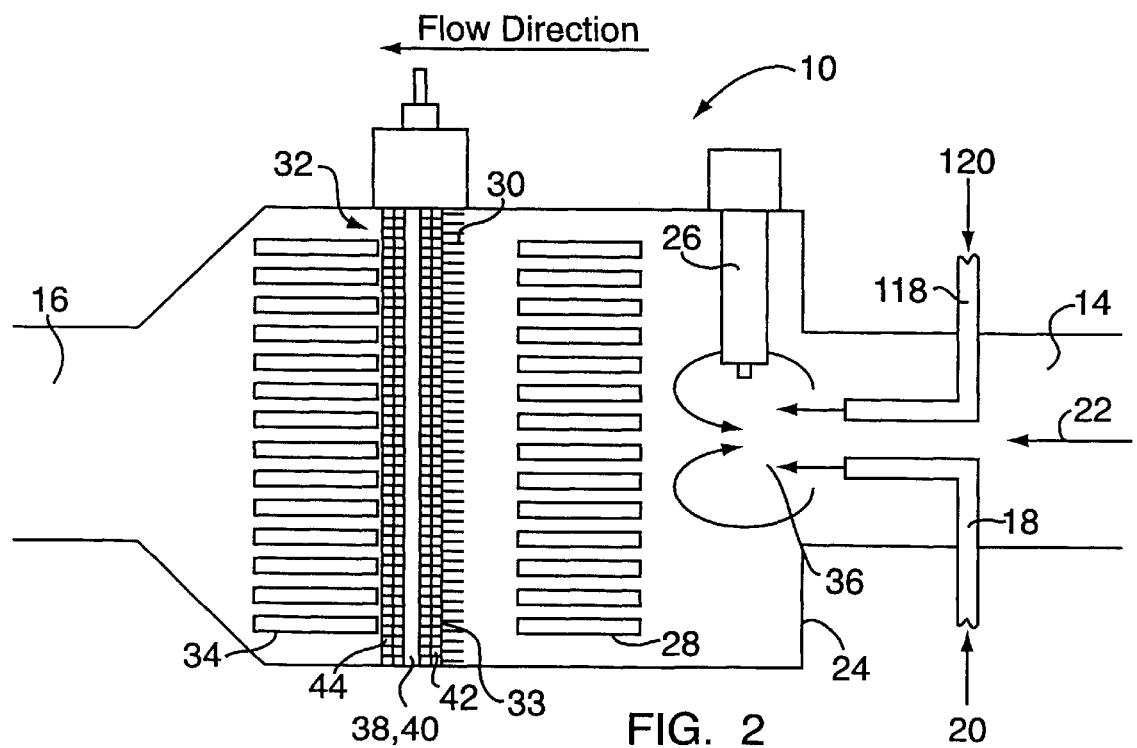
FIG. 2 is a schematic representation of the burner of FIG. 1 with an additional fuel injector.

FIG. 2 is another embodiment of the apparatus of the present invention. In this embodiment, a second injector 118 is added upstream of the flame stabilizer 24. This second injector permits a second fluid 120 to be injected into the feed stream 22. When this apparatus is used as an anode burner, this structure permits separate injection paths for the hydrogen and oxygen used during startup or shutdown respectively.

Referring to FIG. 1, burner operation is as follows.

Burner Operation for Startup:

In the method of the current invention, a feed stream 22 enters the burner 10 through entrance 14. At startup the feed stream 22 is comprised of air, which contains oxygen. Based upon the amount of oxygen in the feed stream 22, the amount of fluid 20, in this case a fuel, being sufficient to accomplish the oxygen depletion desired is added to feed stream 22. The fluid 20 can be any fuel, but advantageously in a fuel cell application is hydrogen.

The phrase the amount of fluid being sufficient to accomplish the oxygen depletion desired means the theoretical amount of additional fuel based upon the oxygen in the feed stream less an amount equal to any appropriate fuel constituents within the feed stream. Therefore, if the feed stream contains sufficient fuel constituents to obtain the oxygen depletion desired, the fluid 20 to be added to the feed stream 22 will be zero.

For example, consider an anode burner during a startup evolution where the fluid 20 is hydrogen. Some amount of hydrogen may be present in the feed stream 22. Therefore, this residual hydrogen can reduce the fluid 20 to be added to the feed stream 22.

Depending upon the temperatures resulting from burning and/or catalytic oxidation, heat exchangers can be employed to assure that tolerance both within the burner 10 and the fuel cell are not exceeded. Resistive heaters 30 can be provided to enhance catalytic module light off.

Burner Operation at Shutdown:

Alternatively in the method of the current invention at shutdown, the feed stream 22 is comprised of hydrogen. In this case, the amount of fluid 20, in this case oxygen, sufficient to accomplish the hydrogen depletion desired is added to feed stream 22. Generally, air would be added having a sufficient oxygen content. The feed stream 22 with the fluid 20 will have a stoichiometry within the diffusion flame flammability limits. Depending upon the temperatures resulting from burning and/or catalytic oxidation, heat exchangers can be employed to assure that tolerance both within the burner 10 and the fuel cell are not exceeded. Resistive heaters 30 can be provided to enhance catalytic module light off.

It should be readily apparent the modifications in the above procedures if the embodiment of the present invention depicted in FIG. 2 is used. Specifically, fluid 20 could be oxygen and fluid 120 could be hydrogen or visa versa.

Although the present invention has been described in considerable detail with reference to certain preferred versions thereof, other versions are possible. Therefore, the spirit and scope of the appended claims should not be limited to the description of the preferred versions contained herein.

What is claimed is:

1. A burner comprising:

a housing defining an entrance and an exit;

an injector positioned within the housing downstream of the housing entrance for injecting a fluid into a feed stream entering the housing;

a flame stabilizer positioned within the housing downstream of the injector;

an igniter positioned within the housing downstream of the flame stabilizer, the igniter and flame stabilizer cooperating to ignite the mixture of the feed stream and the fluid;

a catalytic module having a metal substrate, the catalytic module positioned in the housing downstream of the igniter; and a heat exchanger positioned within the housing downstream of the injector and upstream of the catalytic module.

2. The burner of claim 1 wherein the catalytic module comprises an upstream section using a woven ceramic mesh substrate, the upstream section being spatially upstream of the downstream section.

3. The burner of claim 1 further comprising a second heat exchanger positioned within the housing downstream of the catalytic module.

4. A burner comprising:

a housing defining an entrance and an exit;

an injector positioned within the housing downstream of the housing entrance for injecting a fluid into a feed stream entering the housing;

a flame stabilizer positioned within the housing downstream of the injector;

an igniter including a catalyst, the igntier positioned within the housing downstream of the flame stabilizer, the igniter and flame stabilizer cooperating to ignite the mixture of the feed stream and the fluid;

a catalytic module positioned in the housing downstream of the igniter; and a heat exchanger positioned within the housing downstream of the injector and upstream of the catalytic module.

5. The burner of claim 4 further comprising a second heat exchanger positioned within the housing downstream of the catalytic module prior to the exit.

6. A burner comprising:

a housing defining an entrance and an exit;

an injector positioned within the housing downstream of the housing entrance for injecting a fluid into a feed stream entering the housing;

a flame stabilizer positioned within the housing downstream of the injector;

an igniter positioned within the housing downstream of the flame stabilizer, the igniter and flame stabilizer cooperating to ignite the mixture of the feed stream and the fluid;

a catalytic module positioned in the housing downstream of the igniter;

a heat exchanger positioned within the housing downstream of the injector and upstream of the catalytic module; and another heat exchanger positioned within the housing proximate an upstream surface of the catalytic module.

7. The burner of claim 6 further comprising a second heat exchanger positioned within the housing downstream of the catalytic module prior to the exit.

8. A burner comprising:

a housing defining an entrance and an exit;

two injectors positioned within the housing downstream of the housing entrance, each for injecting a fluid into a feed stream entering the housing;

a flame stabilizer positioned within the housing downstream of the injectors;

an igniter positioned within the housing downstream of the flame stabilizer, the igniter and flame stabilizer cooperating to ignite the mixture of the feed stream and the fluids; and a catalytic module positioned in the housing downstream of the igniter.

9. The burner of claim 8 further comprising a heat exchanger positioned within the housing downstream of the catalytic module prior to the exit.

10. A method of depleting an oxidant from a closed loop, the closed loop having a feed stream therein comprising the oxidant, the method comprising:

mixing the feed stream with a fluid comprising a fuel, the amount of fuel being sufficient to accomplish the oxidant depletion desired, to create a stratified mixture having pockets of fuel and oxidant within flammability limits, diffusion flame burning the pockets of fuel and oxidant thereby depleting the oxidant within the feed stream, and then catalytically oxidizing the balance of the feed stream whereby the oxidant content is further reduced.

11. The method of claim 10 wherein the diffusion burning creates a heat of combustion and including the further step of extracting a portion of the heat of combustion prior to catalytically oxidizing the feed stream.

12. The method of claim 11 wherein catalytically oxidizing the feed stream creates a heat of reaction and including the further step of extracting a portion of the heat of reaction.

13. The method of claim 12 wherein the fluid is hydrogen.

14. The method of claim 13 wherein the oxidant is oxygen.

15. A method of depleting a fuel within a closed loop, the closed loop having a feed stream therein comprising the fuel, the method comprising:

mixing the feed stream with a fluid comprising an oxidant, the amount of oxidant being sufficient to accomplish the fuel depletion desired, to create a stratified mixture having pockets with flammability limits, diffusion burning the pockets thereby depleting the oxygen content within the feed stream, and then catalytically oxidizing the balance of the feed stream where the fuel content is further reduced.

16. The method of claim 15 wherein the conflagration creates a heat of combustion and including the further step of extracting a portion of the heat of combustion prior to catalytically oxidizing the feed stream.

17. The method of claim 16 wherein catalytically oxidizing the feed stream creates a heat of reaction and including the further step of extracting a portion of the heat of reaction.

18. The method of claim 17 further including the step of heating the feed stream being catalytically oxidized.

19. The method of claim 18 wherein the feed stream comprises hydrogen.

20. The method of claim 18 wherein the fluid comprises oxygen.

\* \* \* \* \*